US011432138B1

(12) United States Patent
Jiang et al.

(10) Patent No.: US 11,432,138 B1
(45) Date of Patent: Aug. 30, 2022

(54) SECURE COMMUNICATIONS AMONG ACCESS POINTS (71) Applicant: NXP USA, Inc., Austin, TX (US)

(72) Inventors: Jinjing Jiang, San Jose, CA (US);
Manish Kumar, Clarksburg, MD (US);
Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 349 days.

(21) Appl. No.: 16/662,054

(22) Filed: Oct. 24, 2019

Related U.S. Application Data (60) Provisional application No. 62/750,130, filed on Oct. 24, 2018.

(51) Int. Cl.
| | |
|---|---|
| *H04W 12/04* | (2021.01) |
| *H04W 12/03* | (2021.01) |
| *H04W 76/10* | (2018.01) |
| *H04L 9/32* | (2006.01) |
| *H04L 9/08* | (2006.01) |
| *H04L 9/40* | (2022.01) |
| *H04W 12/06* | (2021.01) |

(Continued)

(52) U.S. Cl.
CPC ............ *H04W 12/03* (2021.01); *H04L 9/085* (2013.01); *H04L 9/3247* (2013.01); *H04L 63/0435* (2013.01); *H04L 63/0442* (2013.01); *H04L 63/062* (2013.01); *H04W 12/0431* (2021.01); *H04W 12/06* (2013.01); *H04W 76/10* (2018.02); *H04W 84/12* (2013.01); *H04W 88/08* (2013.01)

(58) Field of Classification Search
CPC ............ H04L 63/062; H04W 12/0431; H04W 76/10; H04W 84/12; H04W 88/08
See application file for complete search history.

(56) References Cited

U.S. PATENT DOCUMENTS

| | | | | |
|---|---|---|---|---|
| 2007/0206537 | A1* | 9/2007 | Cam-Winget | ........ H04W 12/06 370/331 |
| 2008/0112363 | A1* | 5/2008 | Rahman | ................ H04W 8/005 370/331 |

(Continued)

OTHER PUBLICATIONS

Tschofenig et al., "Performance of State-of-the-Art Cryptography on ARM-based Microprocessors", NIST Lightweight Cryptography Workshop 2015 Session VII: Implementations & Performance, pp. 1-40, Jul. 21, 2015.

(Continued)

*Primary Examiner* — David J Pearson (57) ABSTRACT

A wireless local area network (WLAN) system includes a multi-access point (multi-AP) controller configured to onboard, authenticate, and configure respective basic service sets (BSSs) of access points in a multi-AP network. A plurality of access points (APs), including at least a first AP and a second AP, communicate with the multi-AP controller over a backhaul network, and in response to instructions conveyed by the multi-AP controller over the backhaul network, associate and communicate with client stations (STAs) over wireless fronthaul links in the WLAN system using the respective BSSs configured by the multi-AP controller. The first AP and the second AP are configured to request and receive at least one cryptographic value from the multi-AP controller, and to apply the at least one cryptographic value in securing a message transmitted over the backhaul network from the first AP to the second AP.

20 Claims, 5 Drawing Sheets

(51) Int. Cl.
*H04W 12/0431* (2021.01)
*H04W 88/08* (2009.01)
*H04W 84/12* (2009.01)

(56) References Cited

U.S. PATENT DOCUMENTS

| | | | |
|---|---|---|---|
| 2012/0243685 A1* | 9/2012 | Tanaka | H04L 9/0836 380/270 |
| 2013/0042313 A1* | 2/2013 | Lambert | H04W 12/0471 726/7 |
| 2014/0013117 A1* | 1/2014 | Yun | H04W 12/069 713/171 |
| 2015/0249921 A1* | 9/2015 | Lv | H04L 63/0884 726/4 |
| 2016/0135045 A1* | 5/2016 | Lee | H04L 9/0833 726/9 |
| 2017/0339728 A1* | 11/2017 | Lee | H04W 12/06 |
| 2018/0063714 A1* | 3/2018 | Stephenson | H04W 12/35 |
| 2018/0278625 A1* | 9/2018 | Cammarota | H04L 63/162 |
| 2019/0045558 A1* | 2/2019 | Zhang | H04L 61/2092 |
| 2019/0140826 A1* | 5/2019 | Carrel | H04L 9/0827 |

OTHER PUBLICATIONS

Wi-Fi Alliance, "Device Provisioning Protocol Specification", Version 1.0, pp. 1-124, year 2018.
IEEE 802.11i, IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 6: Medium Access Control (MAC) Security Enhancements, pp. 1-190, Jul. 23, 2004.
IEEE 1905.1, "IEEE Standard for a Convergent Digital Home Network for Heterogeneous Technologies", pp. 1-93, Apr. 12, 2013.
Wi-Fi Alliance, "Multi-AP Specification", version 1.0, pp. 1-66, Jun. 18, 2018.
Harkins et al., "Synthetic Initialization Vector (SIV) Authenticated Encryption Using the Advanced Encryption Standard (AES)", Request for Comments: 5297, pp. 1-26, Oct. 2008.
Wi-Fi Alliance, "Wi-Fi Certified Easy Connect™ Technology Overview", pp. 1-7, Jun. 2018.

* cited by examiner

SECURE COMMUNICATIONS AMONG ACCESS POINTS

CROSS-REFERENCE TO RELATED APPLICATION

This application claims the benefit of U.S. Provisional Patent Application 62/750,130, filed Oct. 24, 2018, which is incorporated herein by reference.

FIELD OF THE INVENTION

The present invention relates generally to wireless local area networks (WLANs), and particularly to protecting security of communications in a multi-access point WLAN.

BACKGROUND

Traditionally, Wi-Fi® deployments in homes and small offices have used a single, centrally-placed access point (AP) to serve an entire coverage space. This approach often provides uneven service, however, with inadequate coverage in some areas. Furthermore, rapid growth in the number of connected devices in the typical home or office creates an increasing demand for wireless access bandwidth, which may not be satisfied by a single AP.

In response to this need, the Wi-Fi Alliance has established a number of new standards for multi-AP networks, in which multiple APs, deployed at different locations in a facility (such as a home or office) work together to extend Wi-Fi coverage and enhance quality of service. In contrast to traditional Wi-Fi APs, which operate independently of one another, using their own, respective basic service set (BSS) configurations, the APs in a multi-AP network are centrally controlled by a multi-AP controller over a backhaul network. The relevant standards are summarized in the Wi-Fi Alliance Multi-AP Specification (version 1.0, released Jun. 18, 2018), which is available at wi-fi.org.

A multi-AP network includes two types of logical entities: one multi-AP controller and one or more multi-AP agents, which run in various APs under the control of the multi-AP controller. The APs are physically connected to the multi-AP controller in a tree topology, by backhaul links that may be either wired, such as Ethernet links, or wireless, such as Wi-Fi links between the APs. The backhaul links operate in accordance with the IEEE 1905.1 protocol, which defines a unified framework for wireline standards, such as IEEE 802.3, and wireless standards, such as IEEE 802.11.

The multi-AP controller receives measurements and capability data from the multi-AP agents, including information regarding both APs and client stations (STAs), and triggers AP control-related commands and operations on the multi-AP agents. The multi-AP controller also provides onboarding functionality to onboard and provision APs into the multi-AP network. Based on the information received from the multi-AP agents, the multi-AP controller sends commands to the multi-AP agents to configure the 802.11 interface (for example, configuring the BSS, including transmit power) of each of the radios of the participating APs for communicating with STAs in the WLAN. The multi-AP controller can also send steering control messages, indicating the BSS to which the APs should attempt to steer each STA that is associated with the network in order to balance network load and facilitate roaming among the APs.

As part of its onboarding functionality, the multi-AP controller authenticates and establishes secure communications with multi-AP agents joining the network. Communications between the multi-AP controller and multi-AP agents are then secured by the underlying authentication of the backhaul network. For example, backhaul Wi-Fi links are secured by the symmetric encryption protocol mandated by WI-FI Protected Access II (WPA2), as defined in the IEEE 802.11i standard. This feature protects messaging between the multi-AP controller and multi-AP agents against out-of-network eavesdropping and other cyber-attacks.

Multi-AP control messages are carried over the backhaul network using control data message units (CMDUs) as defined by the IEEE 1905.1 standard. Each CMDU includes a header in a predefined format, followed by a payload containing a one or more type-length-value (TLV) elements. Chapter 17 of the above-mentioned Multi-AP Specification defines a list of TLVs that can be used in various sorts of control messages.

SUMMARY

Embodiments of the present invention that are described hereinbelow provide improved methods for secure communications in a network of multiple access points, as well as access points implementing such methods.

There is therefore provided, in accordance with an embodiment of the invention, a wireless local area network (WLAN) system, including a multi-access point (multi-AP) controller configured to onboard, authenticate, and configure respective basic service sets (BSSs) of access points in a multi-AP network. A plurality of access points (APs), including at least a first AP and a second AP, are configured to communicate with the multi-AP controller over a backhaul network, and in response to instructions conveyed by the multi-AP controller over the backhaul network, associate and communicate with client stations (STAs) over wireless fronthaul links in the WLAN system using the respective BSSs configured by the multi-AP controller. The first AP and the second AP are configured to request and receive at least one cryptographic value from the multi-AP controller, and to apply the at least one cryptographic value in securing a message transmitted over the backhaul network from the first AP to the second AP.

In some embodiments, the multi-AP controller is deployed in one of the plurality of the access points and is configured to communicate over the backhaul network with multi-AP agents deployed in the plurality of the access points. In a disclosed embodiment, the multi-AP controller is configured to authenticate and establish secure connections with the multi-AP agents, and to transmit the at least one cryptographic value over the secure connections to the multi-AP agents deployed in the first AP and the second AP.

In some embodiments, the at least one cryptographic value includes a shared secret, and the first AP and the second AP are configured to apply the shared secret in generating a key for use in securing the message. In one embodiment, the first AP and the second AP are configured to generate the key by creating a secure association between the first AP and the second AP using the shared secret. Alternatively, the first AP and the second AP are configured to generate the key by performing a simultaneous authentication of equals (SAE) between the first AP and the second AP using the shared secret. In a disclosed embodiment, the first AP and the second AP are configured to apply the key in securing the message using a symmetric cryptographic process.

In other embodiments, the at least one cryptographic value includes a public encryption key of the first AP, the public encryption key being transmitted from the multi-AP controller to at least the second AP, wherein the first and second APs are configured to apply an asymmetric cryptographic process in securing the message using the public encryption key. The the first AP may be configured to compute a digital signature over the message using a private encryption key assigned to the first AP, and the second AP is configured to authenticate the digital signature using the public encryption key. In a disclosed embodiment, the message includes a data packet including a header and a payload containing a plurality of type-length-value (TLV) elements, including at least one first TLV containing control data and a second TLV element containing the digital signature, wherein the first AP is configured to compute the digital signature over the header and the at least one first TLV element.

There is also provided, in accordance with an embodiment of the invention, a method for communication in a wireless local area network (WLAN) system. The method includes onboarding, authenticating, and configuring respective basic service sets (BSSs) of multiple access points, including at least a first AP and a second AP, in a multi-access point (multi-AP) network by a multi-AP controller, by communication between the multi-AP controller and the multiple access points over a backhaul network in the WLAN system. In response to instructions conveyed by the multi-AP controller to the access points in the multi-AP network over the backhaul network, the access points associate and communicate over wireless fronthaul links with client stations (STAs) in the WLAN system using the respective BSSs configured by the multi-AP controller. A request is submitted over the backhaul network from at least one of the first AP and the second AP to the multi-AP controller to provide at least one cryptographic value for use in exchanging messages between the access points. The at least one cryptographic value is transmitted from the multi-AP controller over the backhaul network in response to the request to the at least one of the first AP and the second AP and is applied in securing a message transmitted over the backhaul network from the first AP to the second AP.

The present invention will be more fully understood from the following detailed description of the embodiments thereof, taken together with the drawings in which:

DETAILED DESCRIPTION OF EMBODIMENTS

After a multi-AP controller has onboarded and authenticated a multi-AP agent, subsequent communications between the multi-AP controller and the multi-AP agent are inherently secured. Communications among the multi-AP agents are not currently subject to this same level of authentication, however, and messages from one multi-AP agent to another are therefore vulnerable to tampering by malicious parties. For example, a hacker may attempt to modify one or more of the TLVs in a control message sent from one multi-AP agent to another, or to masquerade as a multi-AP agent in order to send control messages to a genuine multi-AP agent.

Embodiments of the present invention that are described herein address this problem by providing mechanisms for securing messages between multi-AP agents, so as to ensure message integrity and authenticity. These mechanisms take advantage of the authentication and secure communications that have been established between the multi-AP controller and the multi-AP agents in order to generate trusted credentials that the multi-AP agents can use in communicating with one another. These credentials can be used, for example, in securely encrypting and/or digitally signing the control messages that are transmitted between the multi-AP agents over the backhaul network.

The disclosed embodiments relate specifically to multi-AP WLAN systems, i.e., networks operating in accordance with the above-mentioned Wi-Fi Alliance Multi-AP Specification. As explained above, such a WLAN system comprises a multi-AP controller, which onboards, authenticates, and configures respective basic service sets (BSSs) of a plurality of APs, which communicate with the multi-AP controller over a backhaul network. In response to instructions conveyed by the multi-AP controller to the APs over the backhaul network, the APs associate and communicate with client stations (STAs) over wireless fronthaul links in the WLAN system using the respective BSSs configured by the multi-AP controller.

In order to communicate with one another over the backhaul network, pairs of APs request and receive respective cryptographic values from the multi-AP controller, and apply these cryptographic values in securing messages transmitted between the APs over the backhaul network. For example, the cryptographic value may comprise a shared secret, which the multi-AP controller passes to the multi-AP agents of a pair of APs, and which the multi-AP agents then apply in generating a cryptographic key for use in securing one or more messages between them.

As another example, the cryptographic values may comprise public encryption keys of the multi-AP agents, which are then used in securing messages between the pair of APs using an asymmetric cryptographic process, such as a digital signature. In these embodiments, the multi-AP controller serves as a sort of certificate authority, which stores and distributes the public keys, while using the secure connections between the multi-AP controller and the multi-AP agents to ensure the authenticity of the keys that the multi-AP controller distributes.

Figure 1:
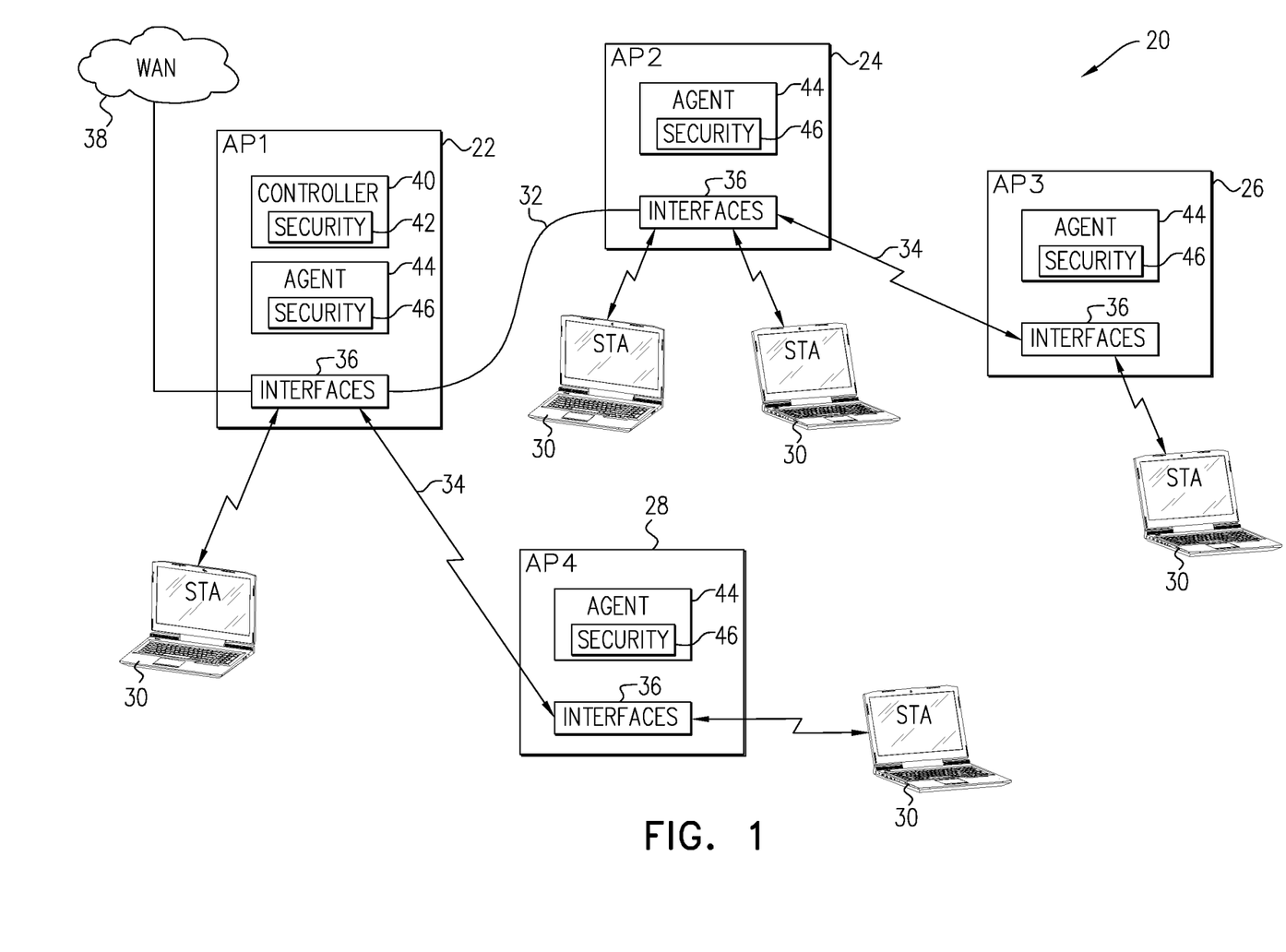
FIG. 1 is a block diagram that schematically illustrates a multi-AP wireless network, in accordance with an embodiment of the invention.

FIG. 1 is a block diagram that schematically illustrates a WLAN system 20 that is configured as a multi-AP network, in accordance with an embodiment of the invention. System 20 comprises multiple APs 22, 24, 26, 28, which communicate over wireless fronthaul connections with client stations (STAs) 30. The APs communicate among themselves over a backhaul network, which is made up of backhaul links 32, 34 arranged in a tree topology. The backhaul links include, in this example, a wired backhaul link 32, such as an Ethernet link, and wireless backhaul links 34, such as Wi-Fi links. To support their fronthaul and backhaul communications, APs 22, 24, 26, 28 comprise respective communication interfaces 36, which typically include wireless interfaces operating in accordance with IEEE 802.11 standards, and possible also wireline interfaces, operating in accordance with applicable Ethernet or powerline communication standards, for example.

AP 22 in this example also serves as a system gateway, connecting system 20 to a wide area network (WAN 38), such as the public Internet. AP 22 runs a multi-AP controller 40, which interacts with and controls the operation of multi-AP agents 44 on APs 22, 24, 26 and 28. Controller 40 and agent 44 are typically implemented as software processes, running on host processors in the respective APs. Although it is often convenient that multi-AP controller 40 run on the AP that serves as the system gateway as in the present example, the multi-AP controller may alternatively run on another one of the APs, or on a separate gateway or other hardware unit that is not an AP.

As noted earlier, multi-AP controller 40 onboards, authenticates, and configures the respective basic service sets (BSSs) of access points 22, 24, 26, 28, by communication with multi-AP agents 44 over backhaul links 32, 34. In response to instructions conveyed by multi-AP controller 40, agents 44 in the access points control respective interfaces 36 so as to associate and communicate with STAs 30 over fronthaul links, using the respective BSSs configured by the multi-AP controller.

Multi-AP controller 40 and multi-AP agents 44 comprise respective security modules 42, 46 which they use in authenticating and establishing secure connections between the multi-AP controller and agents. In addition, security modules 46 in multi-AP agents 44 are configured to request and receive cryptographic values from security module 42 in multi-AP controller 40, and to apply the cryptographic values in securing messages transmitted over backhaul links 32, 34 between multi-AP agents 44 in pairs of APs 22, 24, 26, 28.

Although FIG. 1 shows a particular multi-AP network topology and configuration in system 20, and examples of secure communications are described hereinbelow with specific reference to this system, the principles of the present invention are by no means limited to this topology or configuration. Rather, the methods and modules used in system 20 may similarly be applied in multi-AP networks comprising larger or smaller numbers of APs, with different topologies made up of various types of wired and/or wireless backhaul links. All such implementations are considered to be within the scope of the present invention.

Figure 2:
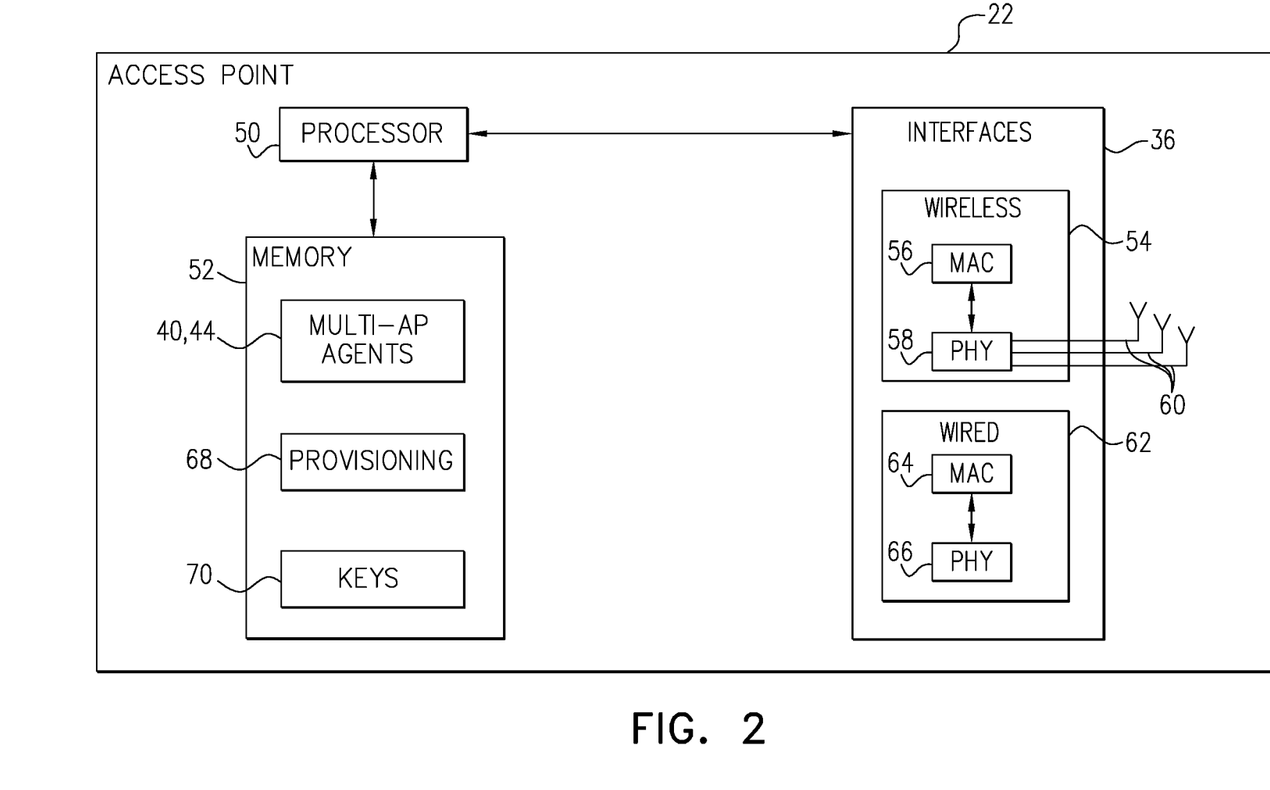
FIG. 2 is a block diagram that schematically shows details of a wireless AP in the network of FIG. 1, in accordance with an embodiment of the invention.

FIG. 2 is a block diagram that schematically shows details of AP 22, in accordance with an embodiment of the invention. APs 24, 26 and 28 are typically of similar construction.

AP 22 comprises interfaces 36, including both a wireless network interface 54 and a wired network interface 62. Wireless interface 54 comprises MAC and PHY interface circuits 56 and 58, which operate in accordance with the applicable IEEE 802.11 specifications. PHY interface circuit 58 comprises one or more radio transceivers, which are connected to antennas 60. Typically (although not necessarily), wireless interface 54 comprises multiple transceivers of this sort, with one or more antennas connected to each transceiver. In general, the components of PHY and MAC interface circuits 56 and 58 are implemented in dedicated or programmable hardware logic circuits, on a single integrated circuit chip or a set of two or more chips.

AP 22 may communicate with other APs in system 20 via wireless network interface 54 and/or via wired network interface 62. To communicate over wired link 32, for example, wired network interface 62 comprises suitable Ethernet MAC and PHY interface circuits 64 and 66. On the other hand, to communicate over wireless link 34, wireless interface 54 may use the bandwidth of the WLAN in particular time slots (i.e., TDMA) and/or within a particular frequency channel or channels (FDMA).

The operations of AP 22, including multi-AP control and agent functions, are controlled by a host processor 50, which typically comprises a programmable processor, along with a suitable memory 52 and other resources (not shown), as are known in the art. Processor 50 is programmed in software or firmware to carry out various control and communication functions in AP 22, including the multi-AP network functions that are described herein. The software run by host processor 50 is typically stored in tangible, non-transitory computer-readable media, such as a suitable RAM or ROM memory in various embodiments, which may be incorporated as a part of memory 52. Host processor 50 may be implemented together with the elements of interfaces 36 in a single system-on-chip (SoC), or as a separate chip or chip set.

Memory 52 contains program code run by host processor 50, as well as associated data, for the purpose of carrying out the functions of multi-AP controller 40 and multi-AP agent 44, including security modules 42 and 46 (FIG. 1). After onboarding by multi-AP controller 40, each multi-AP agent 44 receives and holds provisioning data 68, which is typically assigned using the device provisioning protocol (DPP) defined by the above-mentioned Multi-AP Specification. Provisioning data 68 defines the configuration of the access point connections and BSSID, as well as security credentials for communication with multi-AP controller 40.

In addition, in embodiments of the present invention, multi-AP agent 44 stores cryptographic values 70, such as encryption keys, in memory 52, for use in communication with other multi-AP agents. A number of example methods for distribution and generation of values 70 are described hereinbelow with reference to the figures that follow. Alternatively, other methods of key generation, authentication and encryption that are known in the art may be used for the present purposes and are considered to be within the scope of the present invention.

Figure 3:
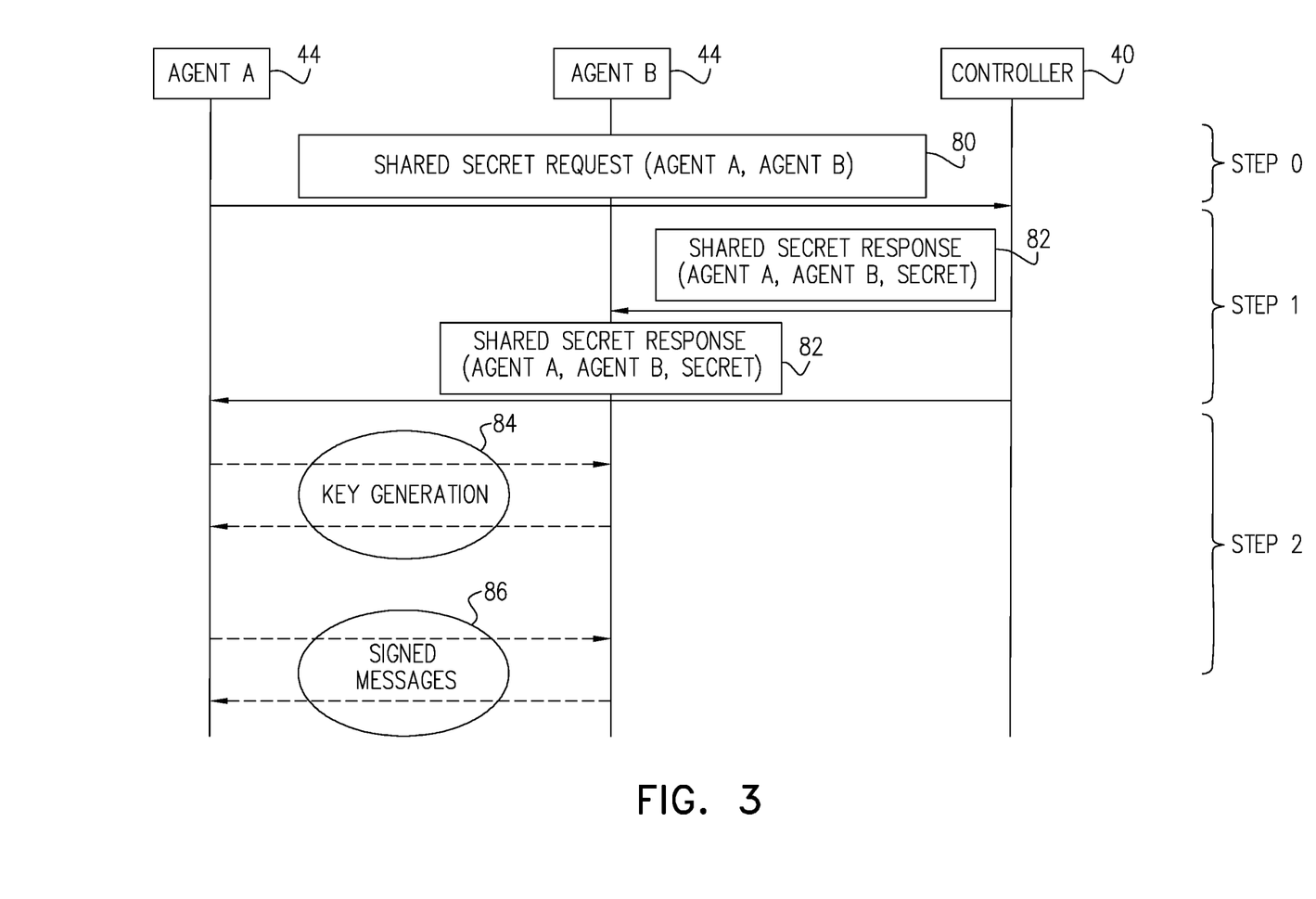
FIG. 3 is a ladder diagram that schematically illustrates a method for secure messaging between APs in a multi-AP network, in accordance with an embodiment of the invention.

FIG. 3 is a ladder diagram that schematically illustrates a method for secure messaging between APs in a multi-AP network, in accordance with one of these embodiments. In this scenario, it is assumed that communications are to be initiated between two multi-AP agents 44 (identified in the figure as Agent A and Agent B), which have not yet established a secure communication channel with one another, although they have each been authenticated by multi-AP controller 40.

Multi-AP agents 44 and controller 40 carry out a three-step process in order to generate a cryptographic key. This key is then used in securing messages between Agent A and Agent B in a symmetric cryptographic process, such as computing and verifying a message authentication code (MAC). In "step 0," one or both of Agents A and B submit a request 80 to multi-AP controller 40 to provide a shared secret. In "step 1," multi-AP controller 40 transmits a secret cryptographic value 82 to both of multi-AP agents 44 over the secure channels that were established in provisioning the agents. For example, value 82 may comprise a random seed value. In "step 2," Agent A and Agent B use secret value 82 in a key generation process 84, such as a multi-step handshake, as is known in the art, which creates a shared, secret cryptographic key. Agents A and B then store this key in respective memories 52 and apply it in securing messages 86 that they exchange.

Only steps 0 and 1 in FIG. 3 require the involvement of multi-AP controller 40. These steps can be performed either on demand, as shown in the figure, or in advance, as a part of the onboarding and provisioning process of multi-AP agents 44. Key generation process 84 in step 2 is carried out cooperatively by the multi-AP agents, without involvement by the multi-AP controller.

Various algorithms that are known in the art can be applied in key generation process 84. For example, Agents A and B may establish a secure association using secret value 82, in a process similar to the creation of a secure association between an AP and a STA in a WLAN. The secure association process is started by the multi-AP agent 44 (Agent A in this example) seeking to transmit a control message to another agent. Agents A and B then carry out a four-way handshake, as defined by the IEEE-802.11i specification for Wi-Fi Protected Access (WPA), in order to generate an encryption key using shared secret value 82 as the starting point.

In an alternative embodiment, Agents A and B generate a pairwise master key (PMK) in key generation process 84 by performing a simultaneous authentication of equals (SAE). SAE is defined in the IEEE 802.11s specification, and it is also used in WPA3, as defined in section 12.4 of the IEEE 802.11-2016 specification. After the PMK has been created, Agents A and B may use a four-way handshake in order to generate keys for use in MAC authentication.

Figure 4:
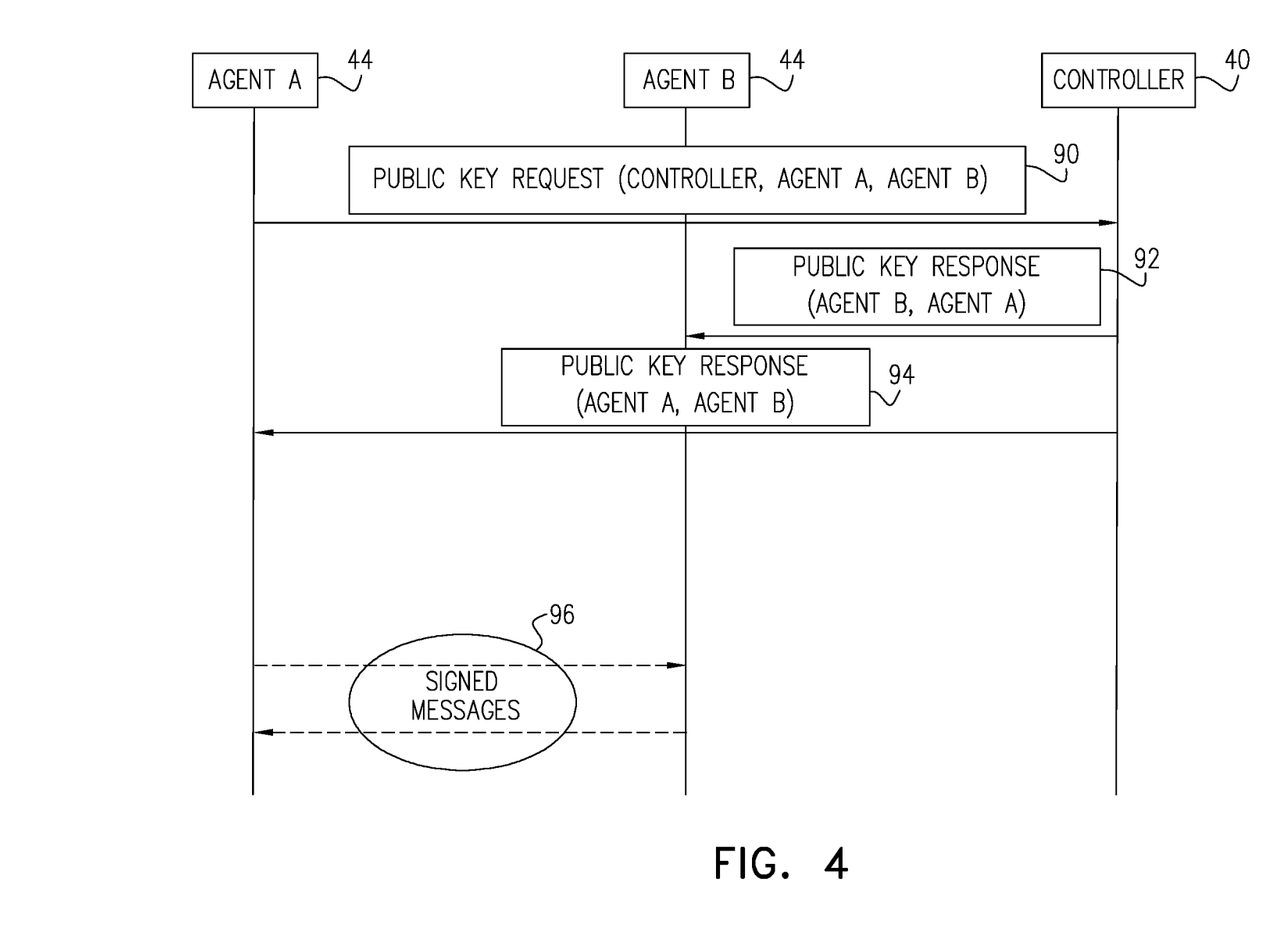
FIG. 4 is a ladder diagram that schematically illustrates a method for secure messaging between APs in a multi-AP network, in accordance with another embodiment of the invention.

FIG. 4 is a ladder diagram that schematically illustrates a method for secure messaging between APs in a multi-AP network, in accordance with another embodiment of the invention. Here it is again assumed that communications are to be initiated between two multi-AP agents 44 (Agent A and Agent B), which have not yet established a secure communication channel with one another, although they have each been authenticated by multi-AP controller 40. As a result of the provisioning process (DPP) used in onboarding multi-AP agents 44, multi-AP controller 40 receives and stores the respective public encryption keys of the corresponding APs. Multi-AP controller 40 distributes these public keys to Agents A and B (and to other multi-AP agents in system 20), for application in securing messages that they will then exchange using an asymmetric cryptographic process.

In preparation for secure exchange of control messages, one or both of Agents A and B submit a request 90 to multi-AP controller 40 to provide their respective public keys one to the other. In response to request 90, multi-AP controller 40 transmits public key responses 92 and 94 to Agents B and A, respectively, over the secure channels that were established in provisioning the agents. To secure responses 92 and 94, for example, multi-AP controller 40 may add an appropriate MAC or digital signature to each of the responses, using the credentials that were established by DPP. In this manner, the authenticity of the public keys is assured. Alternatively, any given multi-AP agent 44 may request that multi-AP controller 40 broadcast the public key of the multi-AP agent to all of the other multi-AP agents in system 20, and the broadcast messages will be similarly secured by multi-AP controller 40. Further alternatively, multi-AP controller 40 may distribute the public keys of multi-AP agents 44 securely as part of the initial onboarding and provisioning process. In any case, multi-AP agents 44 will store the public keys that they receive in respective memories 52.

Figure 5:
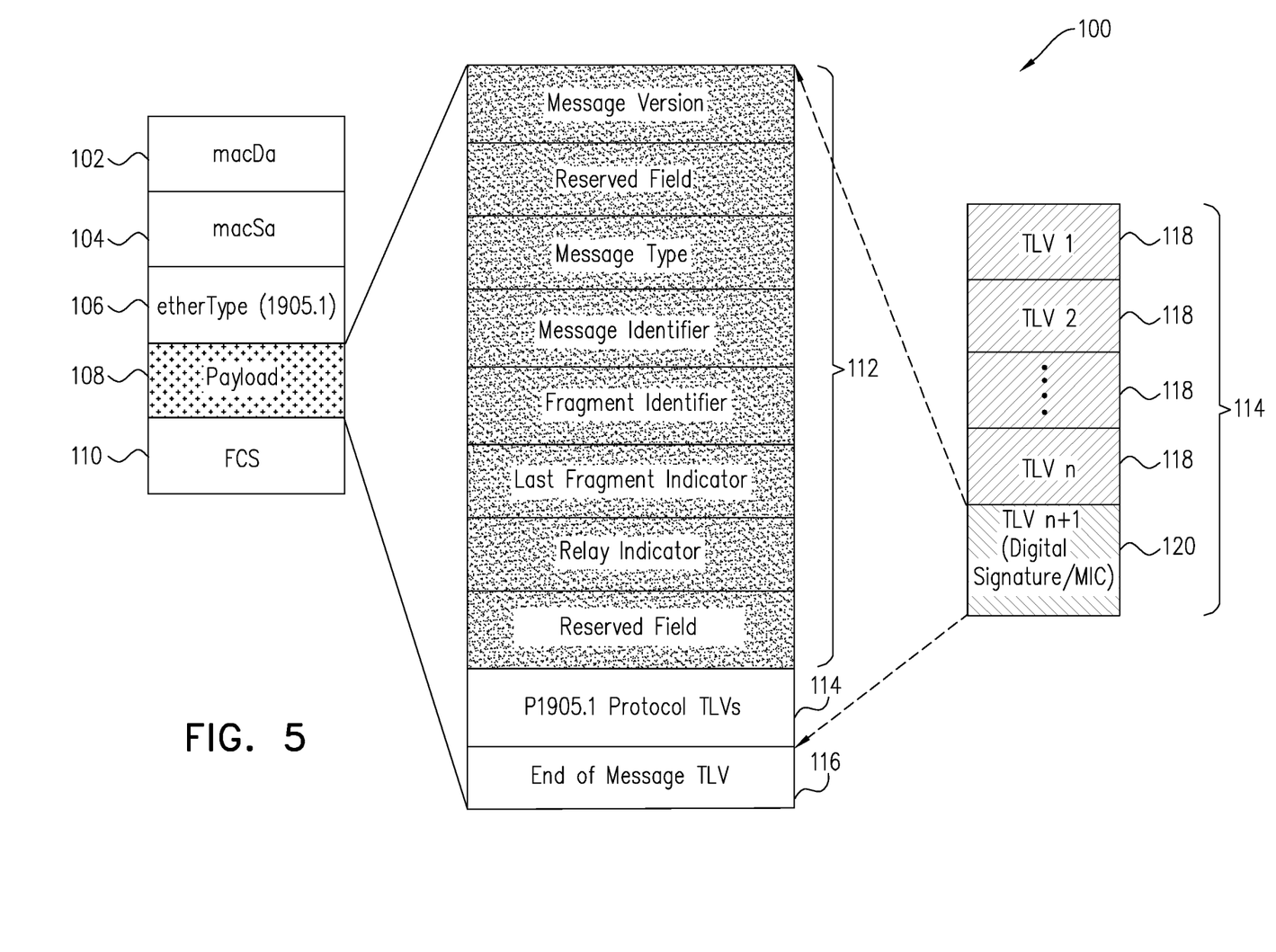
FIG. 5 is a block diagram that schematically illustrates the structure of a secure message exchanged between APs, in accordance with an embodiment of the invention.

After receiving each other's public keys in responses 92 and 94 (or by other means), Agents A and B use their own private keys in computing digital signatures over secure messages 96 that they then transmit one to the other. Upon receiving such a message from Agent A, Agent B will use its stored copy of the public key of Agent A in authenticating the message, and vice versa. An example format for digital signatures of this sort is shown in FIG. 5. Alternatively or additionally, Agents A and B may apply the public keys in encrypting messages that they transmit to one another.

Alternatively, multi-AP agents 44 may receive the public keys of other agents by other means. For example, in legacy multi-AP networks, in which DPP is not used, multi-AP controller 40 may distribute the public keys of the APs to multi-AP agents 44 by adding an appropriate TLV element to AP autoconfiguration messages. As another example, multi-AP agents 44 may exchange their public keys securely using DPP peer discovery requests and responses.

FIG. 5 is a block diagram that schematically illustrates the structure of a secure message exchanged between multi-AP agents 44, in accordance with an embodiment of the invention. The message is contained in a data packet 100 complying with the IEEE 1905.1 protocol mentioned above. Packet 100 comprises a medium access control (MAC) destination address 102 and source address 104, along with an EtherType field 106 specifying that a payload 108 of packet 100 contains an IEEE 1905.1 message. Packet 100 ends with a frame check sequence 110.

Payload 108 of packet 100 contains a protocol header 112, as specified by IEEE 1905.1, followed by a message payload 114 and an end-of-message TLV element 116. Message payload 114 comprises one or more TLV elements 118 containing control data, as defined by the IEEE 1905.1 specification, followed by a signature TLV element 120 containing a digital signature. The multi-AP agent 44 transmitting message payload 114, for example Agent A in FIG. 4, computes this digital signature over header 112 and the preceding TLV elements 118. Upon receiving the message, Agent B will then use the public key of Agent A in verifying and authenticating the digital signature in TLV element 120.

Optionally, message payload 114 may also be encrypted, using a suitable symmetric or asymmetric encryption algorithm.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A wireless local area network (WLAN) system, comprising:
    a multi-access point (multi-AP) controller configured to onboard, authenticate, and configure respective basic service sets (BSSs) of access points in a multi-AP network;
    a plurality of access points (APs), including at least a first AP and a second AP, configured to communicate with the multi-AP controller over a backhaul network, and in response to instructions conveyed by the multi-AP controller over the backhaul network, associate and communicate with client stations (STAs) over wireless fronthaul links in the WLAN system using the respective BSSs configured by the multi-AP controller,
    wherein the first AP and the second AP are configured to request that the multi-AP controller broadcast a respective at least one cryptographic value of each AP from the multi-AP controller to the plurality of APs over the backhaul network, receive the at least one cryptographic value, and to apply the respective at least one cryptographic value in securing a message transmitted over the backhaul network from the first AP directly to the second AP.

2. The WLAN system according to claim 1, wherein the multi-AP controller is deployed in one of the plurality of the access points and is configured to communicate over the backhaul network with multi-AP agents deployed in the plurality of the access points.

3. The WLAN system according to claim 2, wherein the multi-AP controller is configured to authenticate and establish secure connections with the multi-AP agents, and to transmit the at least one cryptographic value over the secure connections to the multi-AP agents deployed in the first AP and the second AP.

4. The WLAN system according to claim 1, further comprising the first AP and the second AP configured to request from the multi-AP controller and receive another at least one cryptographic value from the multi-AP controller, wherein the other at least one cryptographic value comprises a shared secret, and wherein the first AP and the second AP are configured to apply the shared secret in generating a key for use in securing the message.

5. The WLAN system according to claim 4, wherein the first AP and the second AP are configured to generate the key by creating a secure association between only the first AP and the second AP using the shared secret.

6. The WLAN system according to claim 4, wherein the first AP and the second AP are configured to generate the key by performing a simultaneous authentication of equals (SAE) between the first AP and the second AP using the shared secret.

7. The WLAN system according to claim 4, wherein the first AP and the second AP are configured to apply the key in securing the message using a symmetric cryptographic process.

8. WLAN system according to claim 1, wherein the at least one cryptographic value comprises a public encryption key of the first AP, the public encryption key being transmitted from the multi-AP controller to at least the second AP, and wherein the first and second APs are configured to apply an asymmetric cryptographic process in securing the message using the public encryption key.

9. The WLAN system according to claim 8, wherein the first AP is configured to compute a digital signature over the message using a private encryption key assigned to the first AP, and the second AP is configured to authenticate the digital signature using the public encryption key.

10. The WLAN system according to claim 9, wherein the message comprises a data packet comprising a header and a payload containing a plurality of type-length-value (TLV) elements, including at least one first TLV containing control data and a second TLV element containing the digital signature, wherein the first AP is configured to compute the digital signature over the header and the at least one first TLV element.

11. A method for communication in a wireless local area network (WLAN) system, the method comprising:
  onboarding, authenticating, and configuring respective basic service sets (BSSs) of multiple access points, including at least a first AP and a second AP, in a multi-access point (multi-AP) network by a multi-AP controller, by communication between the multi-AP controller and the multiple access points over a backhaul network in the WLAN system;
  in response to instructions conveyed by the multi-AP controller to the access points in the multi-AP network over the backhaul network, associating and communicating over wireless fronthaul links by the access points with client stations (STAs) in the WLAN system using the respective BSSs configured by the multi-AP controller;
  submitting a request to the multi-AP controller for the multi-AP controller to broadcast over the backhaul network to at least the first AP and the second AP a respective at least one cryptographic value of each AP for use in exchanging messages between the access points;
  broadcasting the at least one cryptographic value from the multi-AP controller over the backhaul network in response to the request to the at least first AP and the second AP; and
  applying the respective at least one transmitted cryptographic value in securing a message transmitted over the backhaul network from the first AP directly to the second AP.

12. The method according to claim 11, wherein the multi-AP controller is deployed in one of the plurality of the access points, and wherein broadcasting the at least one cryptographic value comprise communicating over the backhaul network between multi-AP agents deployed in the plurality of the access points and the multi-AP controller.

13. The method according to claim 12, wherein the multi-AP controller is configured to authenticate and establish secure connections with the multi-AP agents, and wherein broadcasting the at least one cryptographic value comprises conveying the at least one cryptographic value over the secure connections from the multi-AP controller to the multi-AP agents deployed in the first AP and the second AP.

14. The method according to claim 11, further comprising the first AP and the second AP configured to request from the multi-AP controller and receive another at least one cryptographic value from the multi-AP controller, wherein the other at least one cryptographic value comprises a shared secret, and wherein applying the at least one transmitted cryptographic value comprises applying the shared secret in generating a key for use in securing the message.

15. The method according to claim 14, wherein generating the key comprises creating a secure association between only the first AP and the second AP using the shared secret.

16. The method according to claim 14, wherein generating the key comprises performing a simultaneous authentication of equals (SAE) between the first AP and the second AP using the shared secret.

17. The method according to claim 14, wherein applying the at least one transmitted cryptographic value comprises applying the key in securing the message using a symmetric cryptographic process.

18. The method according to claim 11, wherein the at least one cryptographic value comprises a public encryption key of the first AP, wherein transmitting the at least one cryptographic value comprises conveying the public encryption key from the multi-AP controller to at least the second AP, and wherein applying the at least one transmitted cryptographic value comprises an asymmetric cryptographic process in securing the message using the public encryption key.

19. The method according to claim 18, wherein applying the at least one transmitted cryptographic value comprises computing, by the first AP, a digital signature over the message using a private encryption key assigned to the first AP, and authenticating the digital signature by the second AP using the public encryption key.

20. The method according to claim 19, wherein the message comprises a data packet comprising a header and a payload containing a plurality of type-length-value (TLV) elements, including at least one first TLV containing control data and a second TLV element containing the digital signature, wherein computing the digital signature comprises calculating the digital signature over the header and the at least one first TLV element.

* * * * *